(12) United States Patent
Schenk et al.

(10) Patent No.: US 10,726,157 B2
(45) Date of Patent: Jul. 28, 2020

(54) METHOD, DEVICE AND SOFTWARE FOR SECURING WEB APPLICATION DATA THROUGH TOKENIZATION

(71) Applicant: DATEX INC., Mississauga (CA)

(72) Inventors: Derek Schenk, Acton (CA); Edward Leavens, North York (CA); Marc Carrafiello, Oakville (CA); Abe Schwartz, Markham (CA)

(73) Assignee: DATEX INC., Mississauga, ON ( * ) Notice: Subject to any disclaimer, the term of this patent is extended or adjusted under 35 U.S.C. 154(b) by 33 days.

(21) Appl. No.: 15/304,771

(22) PCT Filed: Apr. 17, 2015

(86) PCT No.: PCT/CA2015/050322
§ 371 (c)(1),
(2) Date: Oct. 17, 2016

(87) PCT Pub. No.: WO2015/157870
PCT Pub. Date: Oct. 22, 2015

(65) Prior Publication Data
US 2017/0053139 A1 Feb. 23, 2017

Related U.S. Application Data

(60) Provisional application No. 61/980,973, filed on Apr. 17, 2014.

(51) Int. Cl.
*G06F 21/62* (2013.01)
*H04L 29/06* (2006.01)
(Continued)

(52) U.S. Cl.
CPC ...... *G06F 21/6263* (2013.01); *G06F 21/6254* (2013.01); *G06F 40/14* (2020.01);
(Continued)

(58) Field of Classification Search
CPC ............. G06F 21/6263; G06F 17/2247; G06F 17/2264
See application file for complete search history.

(56) References Cited

U.S. PATENT DOCUMENTS 8,266,708 B2 * 9/2012 Shevchenko ....... H04L 63/0407
709/204
2002/0042265 A1 * 4/2002 Kumaran .......... H04M 3/42229
455/414.1
(Continued)

FOREIGN PATENT DOCUMENTS

WO 2013093474 A1 6/2013

OTHER PUBLICATIONS

International Search Report and Written Opinion dated Jul. 22, 2015 in relation to PCT Application No. PCT/CA2015/050322, filed on Apr. 17, 2015.
(Continued)

*Primary Examiner* — Chau Le
*Assistant Examiner* — Vance M Little

(57) ABSTRACT

A method of securing user data provided through a webpage includes receiving an electronic file defining a webpage displayable by a computer. The webpage is initially configured to present an input field for receiving user data from a user, and instruct the computer to transmit the user data to a defined server. The method includes executing code that causes the computer to reconfigure the webpage to present a replacement field for receiving the user data from the user instead of the input field; and upon receiving user data in the replacement field, transmit said user data to a secured server instead of the defined server. The secured server may tokenize the data. The computer receives token data from the secured server; and transmits the token data instead of the user data to the defined server.

14 Claims, 14 Drawing Sheets

(51) Int. Cl.
*G06Q 20/38* (2012.01)
*H04W 12/06* (2009.01)
*G06F 40/14* (2020.01)
*G06F 40/151* (2020.01)
*G06F 40/174* (2020.01)
*G06Q 20/34* (2012.01)
*G06Q 20/40* (2012.01)
*H04L 29/08* (2006.01)

(52) U.S. Cl.
CPC .......... *G06F 40/151* (2020.01); *G06F 40/174* (2020.01); *G06Q 20/34* (2013.01); *G06Q 20/385* (2013.01); *G06Q 20/401* (2013.01); *H04L 63/0421* (2013.01); *H04L 63/0428* (2013.01); *H04L 63/0884* (2013.01); *H04L 67/02* (2013.01); *H04W 12/0608* (2019.01); *G06Q 2220/00* (2013.01); *H04L 2209/16* (2013.01); *H04L 2209/56* (2013.01)

(56) References Cited

U.S. PATENT DOCUMENTS

| | | | |
|---|---|---|---|
| 2009/0013279 A1* | 1/2009 | Klems | G06F 17/243 715/780 |
| 2010/0241847 A1* | 9/2010 | van der Horst | H04L 63/0428 713/152 |
| 2010/0306854 A1* | 12/2010 | Neergaard | G06F 21/6254 726/26 |
| 2011/0307710 A1 | 12/2011 | McGuire et al. | |
| 2012/0030557 A1* | 2/2012 | Wiblin | G06F 17/243 715/226 |
| 2013/0198851 A1* | 8/2013 | Spies | H04L 9/0625 726/26 |
| 2013/0311769 A1* | 11/2013 | Hayes | H04L 63/0442 713/155 |
| 2014/0298477 A1* | 10/2014 | Castro | G06F 21/606 726/26 |
| 2015/0106614 A1* | 4/2015 | Lee | G06F 21/6263 713/150 |

OTHER PUBLICATIONS

Mogull, R. and Lane, A., "Understanding and Selecting a Tokenization Solution." Securosis, Sep. 21, 2010, pp. 1-33.

"Visa Best Practices for Tokenization Version 1.0". Visa, Jul. 14, 2010, pp. 1-4.

"Information Supplement PCI DSS Tokenization Guidelines". Scoping SIG, Tokenization Taskforce PCI Security Standards Council, Aug. 2011, pp. 1-23, Version 2.0.

Extended European Search Reported dated Oct. 5, 2017 in relation to European Patent Application No. 15779344.9, filed on Apr. 17, 2015.

Mogull, R. et al., "Understanding and selecting a tokenization solution", Securosis, L.L.C., Jan. 1, 2010, pp. 1-33, XP055231499.

* cited by examiner

FIG. 3A

```
config {
    name 'ABC Company'          ⎫ Configuration ID
    id 'abc'                    ⎭ 220
    security {
        context {               ⎫
            name 'secure-token-service'    ⎪
            allowed '192.168.1.0/24'       ⎬ Security Context
            auth presharedkey {            ⎪ 221
                key '891298asdf90asd9u8'   ⎪
            }                              ⎭
        }
    }
    location {                  ⎫ Configuration Location
        name 'acct-setup'       ⎭ 222
        stored {                ⎫
            field {             ⎪
                id 'acct-num'   ⎪
                name 'accountNumber'  ⎪
                lookup true     ⎬ Stored Fields
            }                   ⎪ 223
            field {             ⎪
                id 'somekey'    ⎪
                name 'customerSpecificKey'  ⎪
                lookup true     ⎪
            }                   ⎭
        }
        secured {               ⎫
            id 'cc'             ⎪
            field {             ⎪
                id 'card-number'    ⎪
                name 'pan'      ⎬ Sensitive Fields
                type pan        ⎪ 224
                tokenize true   ⎪
                synchronize true  ⎪
            }                   ⎪
            ...                 ⎭
        }
    ...
}
```

```
generator pan {
    luhn true
    mask '4### #### #### LLLL'
} validate pan {
    luhn true
    mii(['3', '4', '5'])
    iin([
        //Amex
        '34', '37',
        //Mastercard
        '50', '51', '52', '52', '54', '55',
        //Visa
        '4'
    ])
} validate custom {
    return value.length()>5;
}
```
Sensitive Fields 224

```
save {
    id 'btnSave'
    eventType 'submit'
}
```
Save Triggers 225

```
dependencies {
    dependency {
        type 'script'
        url 'https://sample.net/secure/scripts/work.js'
    }
    dependency {
        type 'stylesheet'
        url 'https://sample.net/secure/scripts/work.css'
    }
}
```
Dependencies 226

FIG. 3B

METHOD, DEVICE AND SOFTWARE FOR SECURING WEB APPLICATION DATA THROUGH TOKENIZATION

CROSS-REFERENCE TO RELATED APPLICATIONS

The present application is a national filing of International Application No. PCT/CA2015/050322, filed Apr. 17, 2015, which claims priority from U.S. Provisional Patent Application No. 61/980,973, filed Apr. 17, 2014, the contents of which are hereby incorporated by reference.

TECHNICAL FIELD

This relates to computer network security and more particularly to software for securing web application data.

BACKGROUND

Data security has become critical in modern computing and networking. Two known way of securing data are data encryption and tokenization.

Encryption aims to secure data in its place, and tokenization removes the data from the system and replaces it with an alternate (token) value.

Off-the-shelf encryption and tokenization solutions are often not sufficient for use by many organizations.

Implementing custom encryption or tokenization, however, often requires significant changes to existing computer systems and software. These changes require development, testing, planning and implementation, which can be expensive and can introduce software bugs. As a result of this risk and cost, many organizations choose not to implement.

This is particularly acute for data provided by way of the internet, and input into web pages.

Accordingly, methods, software and devices for securing computer data are desirable.

SUMMARY

Methods and software for securing data entered by way of internet web application are presented.

An example method of securing user data provided through a webpage includes sending the data to be replaced to secured and replacing data on the webpage with a token equivalent.

In accordance with a disclosed method, a method of securing user data provided through a webpage includes: receiving an electronic file defining a webpage displayable by a computer. The webpage is configured to, when displayed: present an input field for receiving user data from a user of the computer, and instruct the computer to transmit the user data to a defined server, and modify the electronic file to include code that causes the computer to, when displaying the webpage; reconfigure the webpage to present a replacement field for receiving the user data from the user instead of the input field; upon receiving user data in the replacement field, transmit the user data to a secured server instead of the defined server; receive token data from the secured server; and transmit the token data instead of the user data to the defined server.

Other features will become apparent from the drawings in conjunction with the following description.

BRIEF DESCRIPTION OF THE DRAWINGS

In the figures which illustrate example embodiments,

FIGS. 3A and 3B show example pseudo code of configuration of a security device of FIG. 1;

DETAILED DESCRIPTION

Figure 1:
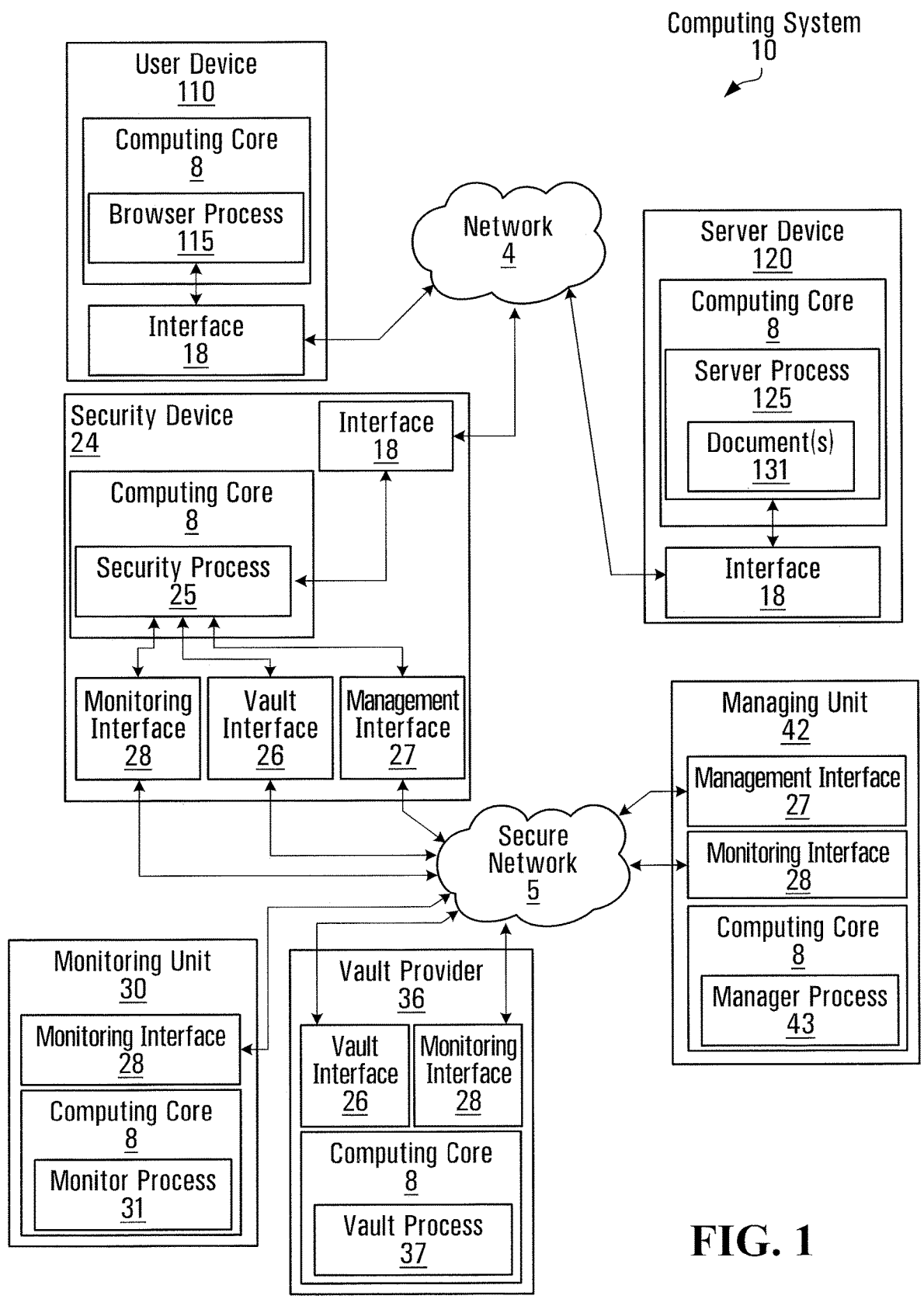
FIG. 1 is a schematic block diagram of an exemplary computing environment.

FIG. 1 is a schematic block diagram of an exemplary computing system 10 that may be used to reconfigure an electronic file representing a webpage displayable by a computer—e.g. HTML (HyperText Markup Language) document 131, provided by a server 120, so that some or all of the contents provided by or to HTML document 131 at a user computing device 110 will be replaced with secured content.

As illustrated, system 10 includes one or more user devices 110, one or more of server devices 120, one or more of security devices 24, and at least one of each of the monitoring units 30, a vault provider unit 36, and a managing unit 42. Security device 24, monitoring unit 30, vault provider 36 and managing unit 42 can be deployed as separate devices, or combined, in any combination.

In an embodiment, server device 120 may, for example, be a merchant server used to sell goods or services by way of the internet. User device 110 may, for example, be a customer computing device. Security device 24, monitoring unit 30, vault provider 36 and managing unit 42 are interposed between user device 110 and server device 120, for example, in order to securely conclude an electronic transaction between the customer and merchant.

The secured content may be a visual replica of the original so that change is transparent to the user, while the original document continues to function as designed prior to the change. Data secured by this reconfiguration may be directed to a security device 24, and original HTML document 131 fields may contain tokenized data replacements.

As will be appreciated tokenization involves substituting a data element (typically sensitive) with a non-sensitive equivalent, referred to as a token. The token has no extrinsic or exploitable meaning or value.

An example process is initiated by modifying original HTML document 131, located on server device 120, to include a code fragment 200, which is further described with reference to FIG. 2. Conveniently, an existing HTML document need not be further modified, other than to include code fragment 200. Browser process 115 (e.g. an executing web browser) processes code fragment 200, in order to reconfigure other portions of HTML document 131 and security processing, as described below.

User device 110 is coupled to security device 24 and server device 120 using network 4. Network 4 may include one or more wireless and/or wired communication networks; one or more private intranet systems and/or public Internet; and/or one or more local area networks (LAN) and/or wide area networks (WAN). Network 4 connecting user device 110 to security device 24 may or may not be the same network 4 as the network that connects user device 110 to service device 120. VPN tunnels or other secured connections may, or may not, be established over network 4.

Security device 24, monitoring unit 30 and managing unit 42 are coupled by way of network 5. Network 5 may or may not be the same network as network 4. Network 5 may include one or more wireless and/or wired communication systems; one or more private intranet systems and/or public Internet system; and/or one or more local area networks (LAN) and/or wide area networks (WAN).

Security device 24 may be a plurality of devices providing one or more network addresses that may or may not be load balanced providing scalability and failover. Security device 24 may be placed at multiple geographic locations. Security device 24, monitoring unit 30, managing unit 42, vault provider 36, server device 120 and user device 110 may all be located in a single geographic location, in different locations, or any combination of locations.

Each of security device(s) 24, monitoring units 30, managing units 42, vault providers 36, user devices 110 and server device 120 may be a portable computing device (e.g. cell phone, smart phone, tablet, gaming system, laptop or any other device that includes a computing core), and/or a fixed computing device (e.g. personal computer, computer server, cable box, other home or office computing equipment or any other device that contains one or more computing core). Portable or fixed computing device include a computing core 8 and one or more interfaces 18, 26, 27, 28.

Each of interfaces 18, 26, 27, 28 may include software or firmware and/or hardware, and/or be under control of such software hosted by computing core 8, to support one or more communication links over networks 4 and 5 and/or directly. For example, interface 18 of security device 24 supports a plurality of communication links via network 4 between user device 110 and security device 24. As yet another example, interface 28 supports a communication link between the monitoring unit 30 and any of the other devices and/or units 24, 36, 42 via the network 5.

User device 110 may be any conventional computing device—such as a portable computing device (e.g. cell phone, smart phone, tablet, gaming system, laptop or any other device that includes a computing core), and/or a fixed computing device (e.g. personal computer, computer server, cable box, satellite receiver, television, home entertainment system, other home or office computing equipment or any other device that contains a computing core)—that communicates with server device 120 using browser process 115 which may be any software capable of requesting and processing HTML documents, where the user interacting with user device 110 may be a human, machine, computing device, server, hardware, software or any other device, process or entity that is capable of interacting with user device 110. Browser process 115 may, for example, take the form of any conventional internet web browser.

Server device 120 may be a portable computing device (e.g. cell phone, smart phone, tablet, gaming system, laptop or any other device that includes a computing core), and/or a fixed computing device (e.g. personal computer, computer server, cable box, satellite receiver, television, home entertainment system, other home or office computing equipment or any other device that contains a computing core). Device 120 includes a computing core 8 and one or more interfaces 18, and is providing server process 125 which is capable of transmitting HTML document(s) 131 where the content includes HTML content. One or more HTML document(s) 131 that is/are provided to user device 110 by server device 120 is modified to contain a code fragment 200 which may be a script inclusion or other HTML content that will cause browser process 115 to reconfigure HTML document 131. An example code fragment 200 is further described in FIG. 2.

Code fragment 200 causes browser process 115 to request modifying code from security device 24. The modifying code, when executed, may cause browser process 115 to initiate the reconfiguration and security processing which is further described in FIG. 4. The modifying code provided by security device 24 to browser process 115 may be java script code, HTML 5 code or the like.

Once reconfiguration has completed, browser process 115 may hide the original configured content and in its place present the user with an identical representation of the original content, in accordance with the modifying code provided by security device 24. The replaced HTML content includes a secured version of the hidden content which has been provided to security device 24 by browser process 115, and presented back to the browser process 115 in a frame. Secured HTML content 136 is a copy of the original hidden content which has been altered by security device 24 to include a replacement field to receive user data and transmit user input to the security device 24 instead of server process 125.

Browser process 115 may also communicate with security device 24 or the secure HTML content loaded in a frame. The exact mechanism of such communication will be dependent on the browser's capabilities, but should result in one or more token substitute value of the data being transmitted back to HTML document 131. In turn, the user submitting the original page will send the token substitute values to the server process 125.

In an example embodiment, the replaced HTML content may be used to capture sensitive information from the user—such as personal identifying information, payment information (e.g. a payment card identifier), or the like. The sensitive information may then be provided to security device 24, by the reconfigured HTML document 131. Token data will be returned to browser process 115, which may then be provided to server process 125.

The method used to receive token substitutes will be dependent on the capabilities of browser process 115. One supported method may be to use standard web messaging functionality that allows inter-window communication, and an additional method may use a server polling process to security device 24 that will be used when the web messaging functionality is not available or not functioning.

Security device 24 may use a configuration (further described in FIGS. 3A and 3B) when generating code instructions, as well as when securing HTML content that will be returned, where the configuration defines HTML elements, validations that should be performed on the sensitive data, the format of the token substitute data that will be returned, and meta data and lookup values that will be stored. The configuration also identifies on what action browser process 115 should initiate a call to security device 24 to persist the data in the secured frame. This action may be any HTML event initiated by a user or browser process such as clicking a field, element, button, page unload or any other event. This persistent action may initiate a call from browser process 115 to security device 24 that may cause security device 24 to initiate a call to the vault provider 26 using the vault interface 26. The configuration used by the security device 24 provides the ability to configure the token substitutes that can be random data, or formatted as to match the source value containing any part of the source value. For example, if the secured field as a payment card number, the substitute token could be configured to contain the first two (2) digits of the original value allowing server process 125 to validate the type of payment card.

Security device 24 will, when processing secured content to present back to browser process 115, optionally to replace the substitute token value with either the original secured value or an alternate value as defined by the configuration. For example, if the secured field is a payment card number, then the configured view value may be configured to show a masked value with all values replaced with 'X', and only the last four (4) digits exposed.

Vault provider 36, using standard computing core 8, runs vault processor 37, which provides vaulting capability, through a vault interface 26. Vaulting capability includes the ability to retrieve a unique token value, store secure values and metadata for the given token, and retrieve the secure values and metadata for the given token. Vault processor 37 provides persistent storage of the tokens, the metadata and the secure values, such that security device 24, as well as any other device capable of using vault interface 26 can access the tokens, secure data and metadata. The vault processor has the ability to generate token values using a named pattern such as "payment card", or by using a pattern or string representing the format that the token should follow. For example, vault provider 26 may accept a request for a unique token given a format string "45##-####-###L-1234" where the returned token will be generated to start with "45", and with "1234", the "#" characters will be replaced with a numeric value, and the "L" will be a value generated such that the new token will pass a Luhn check, and the given returned value is unique across all stored values in vault provider 36.

Vault provider 36, in addition to storing the original secured value, has the capability to store additional data, where the secure data and the additional data are stored together with the token, and the additional data may include any value including but not limited to strings, dates, numbers, and masked presentations of the original value. For example, if vault provider 36 is used to store credit card data, the token may follow a payment card format. In addition a masked representation of the original card number may be stored where all but the last four (4) digits have been replaced with an 'X'.

Through the use of security device 24 to remove secure data from user input and vault provider 36 to persistently store data, system 10 enables the transparent removal of secure data from user input, thereby eliminating the secure data from being stored, processed or viewed by an existing server (e.g. server 120), without changing server 120. The existing system would receive a token value, in an acceptable format, where that token value may be later used to obtain the original secure value, where the original value may be required to complete processing or a transaction. For example, the system may be configured to remove credit card numbers from user input, where the credit card is being supplied to support recurring billing, and the original system was designed to store these credit card numbers to apply these recurring charges. After implementation of the invention the original system would receive a token substitute in a valid credit card number format allowing the original system to continue functioning as originally designed. When the original system is required to process payments it may use another configuration of security device 24 to transparently de-tokenize the data, or may use vault interface 26 to make API calls to obtain original credit card numbers. In this manner the invention, when implemented, provides the ability to transparently remove the secure credit card data from the original system, to be stored by vault provider 36 in an alternate location, without having made any modifications to the original system.

Figure 2:
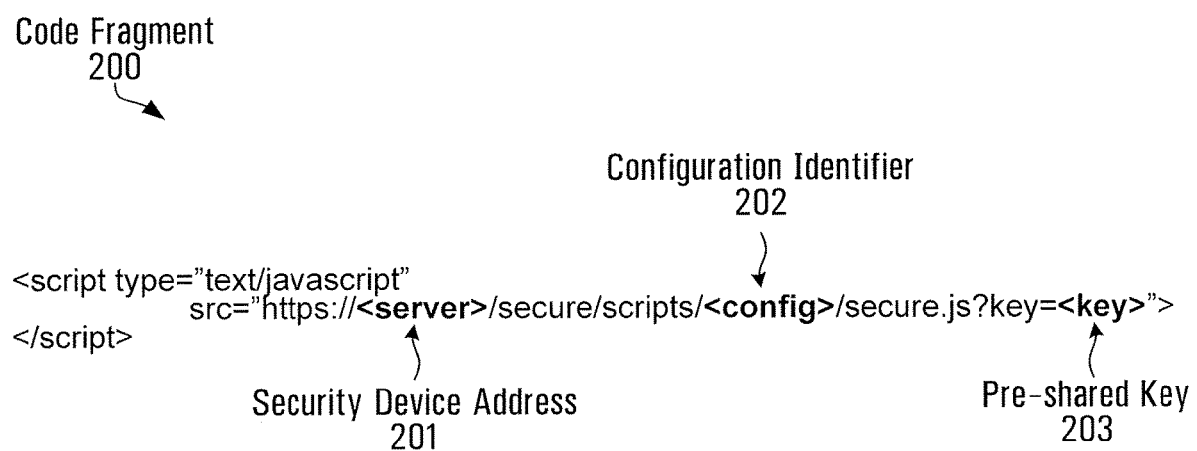
FIG. 2 is a sample code fragment used in the environment of FIG. 1.

FIG. 2 shows a sample of code fragment 200 that may be used when modifying the HTML content 131 provided by server process 125. Code fragment causes browser process 115 to download a set of code instructions, for example, from security device 24.

Code fragment 200 is configured to identify security device 24, for example, by providing the security device address 201, which may be a DNS lookup value, IP address or other computer address location that a user browser can interpret. Code fragment 200 may also contain a configuration identifier 202 used by security device 24 to load the correct configuration, as well as a pre-shared key 203 that may be used to validate the authenticity of the request and further identify server process 125.

FIGS. 3A and 3B show pseudo code representation of the configuration that would be used by the security device 24 to control reconfiguration HTML content 131. The configuration contains a configuration identifier 220 which is used together with configuration location 222 to build configuration identifier 202 contained in the code fragment 200. For example, if configuration id 220 is "abc", and configuration location 222 is "acct-setup", configuration identifier 202 would be /abc/acct-setup.

Security context 221 may define allowable IP address range from which clients can initiate connections. For example, a combination of "allowed" and "rejected" addresses can be defined such that any rejected address will be processed first creating the denied list, after which the allowed address will be processed. The IP addresses may be any combination of IPv4 or IPv6 addresses. In addition to the address ranges the pre-shared key 203 is also defined in section 221, where this pre-shared key must match the value defined in the code fragment 200.

Stored fields section 223 contains fields that will be extracted from HTML content 131 and stored with the vaulting process as metadata and optionally lookup fields. Stored field section 223 contains sufficient configuration information to allow security device 24 to extract the configured fields from the HTML content 131.

Secured fields 224 section contains the fields in the source page that will be secured. This section defines the type of data, if a token should be generated, the format of the token substitute that should be generated, as well as any validations that should be applied, either pre-defined or custom.

Save triggers 225 section of the configuration identifies the elements in the source field that will trigger the save action processing, as well as the type of event that will be triggered.

Dependencies 226 section in the configuration lists the dependencies that are required, as well as the type of dependency.

Figure 4:
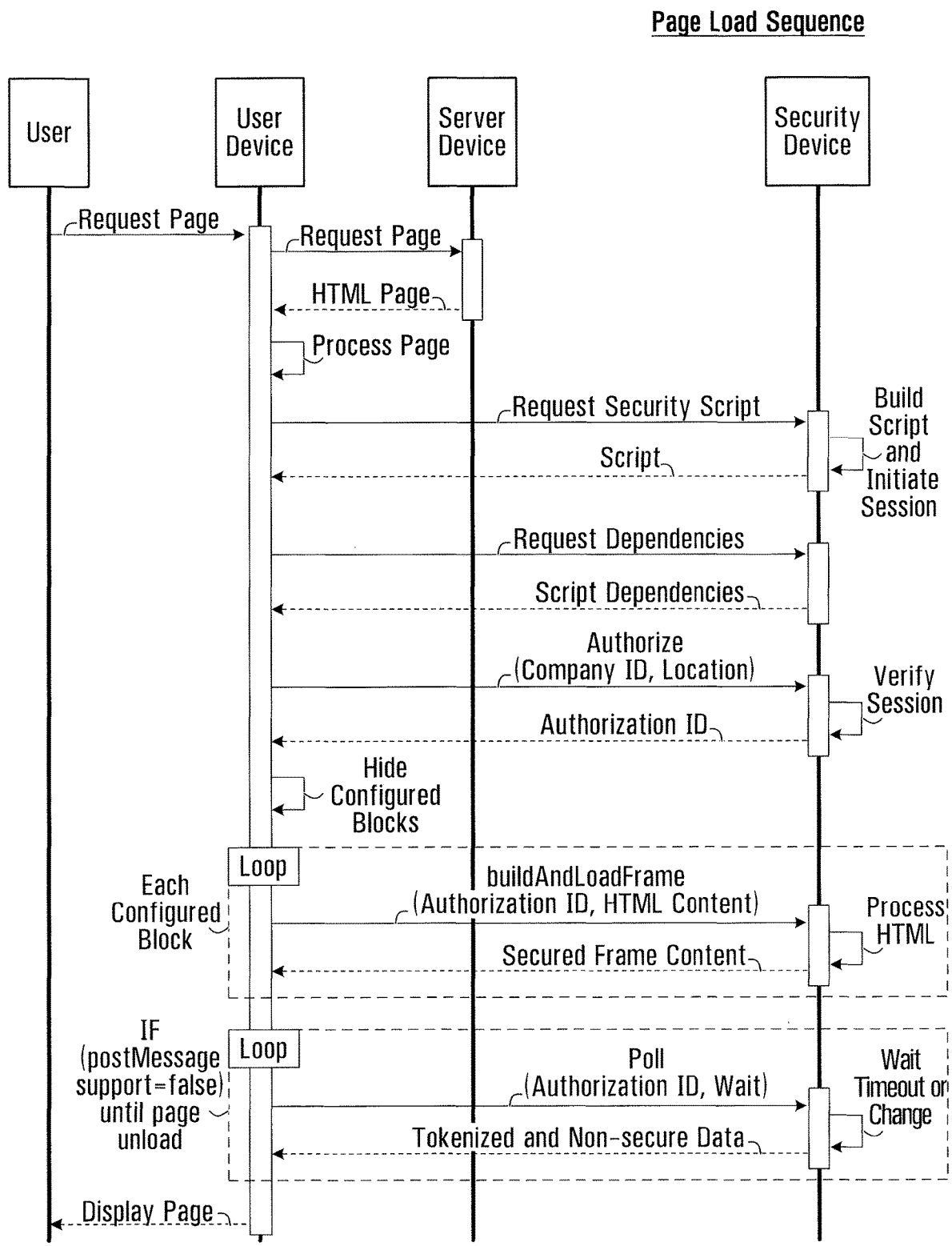
FIG. 4 is a sequence diagram illustrating a page load sequence of the HTML content.

FIG. 4 shows a load sequence of HTML content 131, as modified to include code fragment 200. Specifically, a user initiates the process by requesting the HTML content 131 from the server device 120. Server device 120 returns HTML content 131. User device 110 will process the page and complete any processes that would normally be executed as part of the page load.

When browser process 115 processes code instruction 200, a request is made to security device 24 to download modifying code—e.g. reconfiguration scripts and instructions.

Security device 24 may provide a script file using the configuration details defined in FIGS. 3A and 3B—for example, by creating a customized script. The creation of the script may also create a session on the security device 24 unique to the calling browser process 115, using values such as the IP Address, the browser and operating system types, and any other configured values that can be obtained from the request. The session is initiated with a timestamp, which is used for time-based invalidation. The reconfiguration script, upon being returned from the security device 24 will be processed by the browser process 115 initiating the reconfiguration process.

The modifying code contains a set of dependencies required for the page at device 110, where the security script loads these dependencies. The dependencies may include dependencies loaded from the security device 24, and may also include dependencies loaded from server device 120 or any other server. For example, one of the dependencies could be a javascript library hosted on a public content delivery network.

When all of dependencies have been loaded, the modifying code will initiate an authentication process, where the authenticate call will include the company id and the location. The information supplied with the authenticate call must match the information provided when the script is loaded or the authentication will fail. When successful an authentication call will return the authorization id, a value that can be used to identify the server side session.

The modifying code may, at this point, hide all configured blocks, based on the configuration details. This process will typically execute regardless of the results of the authorize call to ensure that if the authorize is not successful the original page is rendered unusable for the secured fields.

For each configured block in the configuration a new frame may be created by browser process 115, with a call to security device 24 loading the frame contents including the authorization id, as well as the HTML content corresponding to the block that was configured. The frame will be configured so that it has the same style and attributes as the original content that was removed, and so that the replacement is not visible to the user. The frames' contents will be a processed version of the HTML content, where the content is wrapped in a valid HTML document body, and a set of required dependencies such as scripts and stylesheets are added based on the configuration. The HTML is also altered such that all elements are configured, using event handlers, to submit any changes to the security device 24 on each change. An example data entry process is further described in FIG. 5.

A browser detection process that may include details identified during the request for the reconfiguration script will be used to detect if the user browser 115 supports web message functionality. If this functionality is detected and usable then an event listener is registered to receive and process changes. If the message posting is not detected or is not usable, the reconfiguration script will initiate a long poll process: a timer thread may be created and a synchronous call made, in the timer thread context, to security device 24. The poll call may include the authorization id and a wait time. The server process will block this request for the wait time, or until a change has been received, at which time it releases the call and returns the changed data.

Once the modifying code completes execution at browser process 115, the resulting page is displayed to the user.

Figure 5:
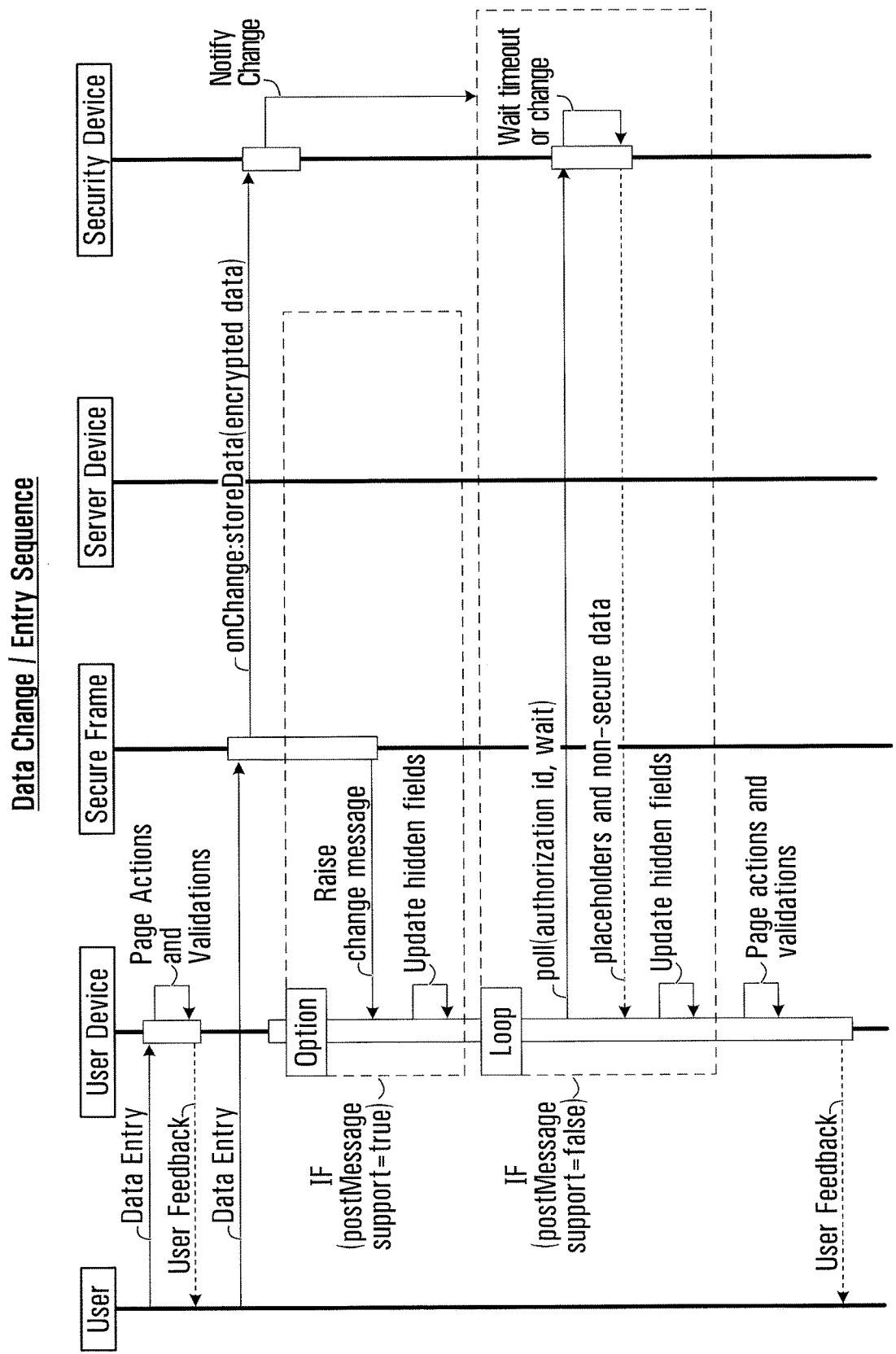
FIG. 5 is a sequence diagram illustrating a data entry sequence.

FIG. 5 outlines a data entry sequence in which input from the secured frame is transferred to the original HTML page (as presented by browser process 115 from HTML content 131). For any data entered by the user in the original page any validations, scripts and other processes will execute without any interaction or impact from the reconfigurations script or the secured frame. The sequence may begin when a user enters or alters data in the secured frame, where these changes will cause the event handlers to execute. The change handlers can be configured to execute immediately, or after a period of inactivity. For example, on a text input field the event handler can be configured such that when the user stops typing for one second the submission process is executed.

The event handler, when it executes, will submit the configured fields from the secured frame to the security device 24. All of the data may be encrypted using asymmetric key that was previously negotiated, and data is submitted, in encrypted format to the security device 24. The submission call will return any substitute tokens as well as any non-secured fields. The on change process will also notify the server side session that the data has changed, which will trigger the poll process to release, if it is running.

If message posting functionality is available, as previously determined during reconfiguration, the change process when completed returns the substitute tokens and non-secured data where these values will be passed as data using a message event. The original window, which has a message event receive handler registered, will receive and process these data change events. The substitute tokens and non-secured data, as passed via the message event, will update the original hidden fields.

If message-posting is not available, then the reconfiguration script will have started the poll process. The submission of data to security device 24 will trigger a notification to the corresponding poll process as identified by the authorization id, where this poll process will release and return any substitute tokens as well any non-secured fields. When the poll process is released, any tokens and non-secured fields returned will be used to update the original hidden fields. The poll process will then be restarted again, restarting the process.

As the data is updated in the original HTML document, page actions, scripts or validations that would normally execute as a result of the original page will be initiated.

Figure 6:
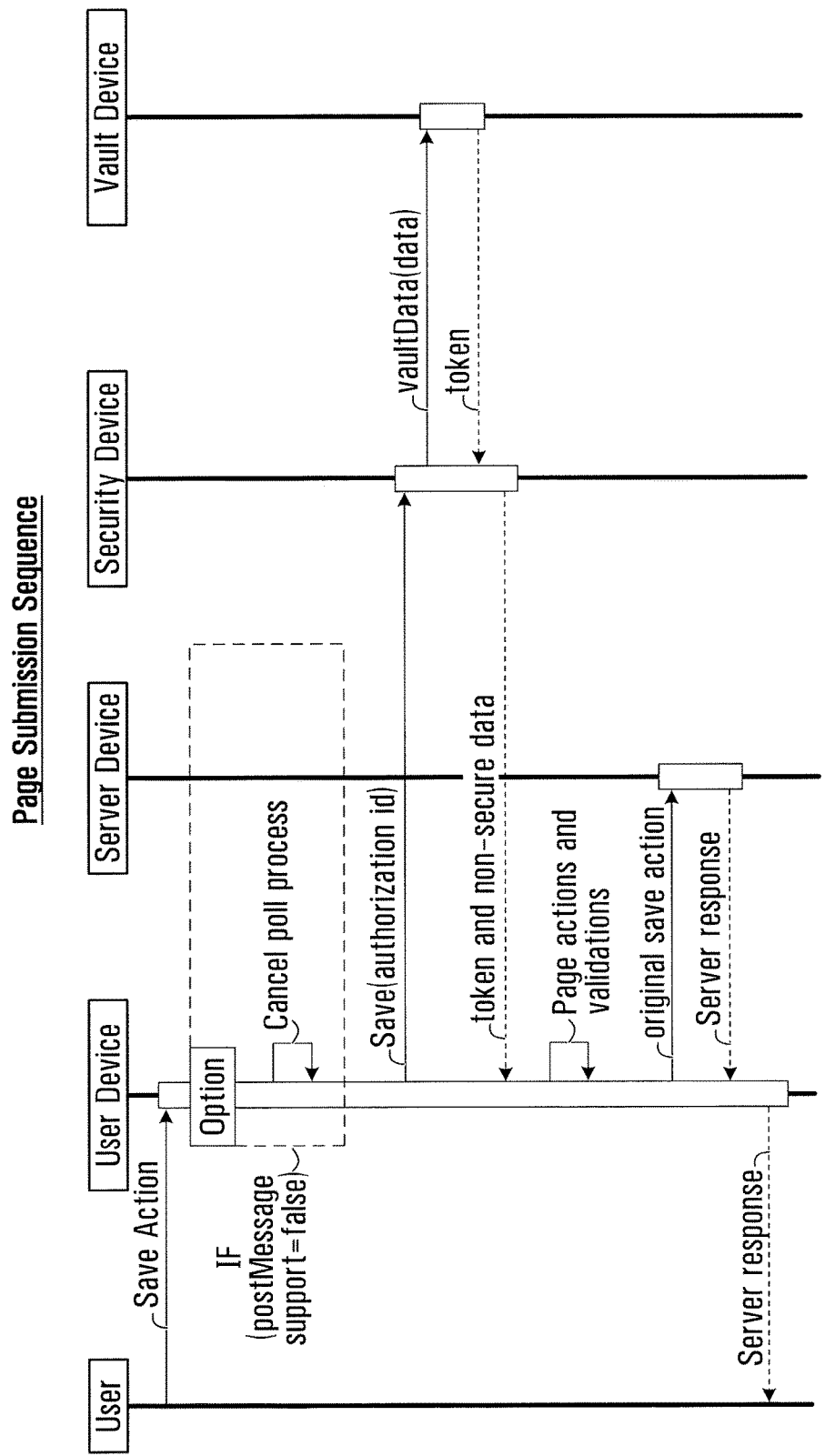
FIG. 6 is a sequence diagram illustrating page submission.

FIG. 6 shows an example page submission sequence diagram. This sequence may be performed in response to the user triggering the save processing as defined in the configuration section 225.

If message-posting functionality is not available, as previously determined during the reconfiguration script process, then the poll timer will be cancelled and abandoned such that any return will be ignored, and the poll process will be disabled, so that no poll processing will be re-initiated. The poll processing flow is further described in FIG. 12.

Browser process 115, having been reconfigured by the reconfiguration script to execute on the save action, will initiate a call to security device 24 to save data currently stored in the server session, passing the authentication id. This action will cause security device 24 to notify the session that the process is complete, which will cancel any listening poll processes, causing them to return an empty response. Security device 24 will then also call the vault provider 36 using the vault interface 26 to all of the data as defined by the configuration, where the data includes secured and non-secured values, tokens, metadata, lookup values and any other information required to be persisted. The save action will return all of the token substitutes as well as non-secured fields, where the original page is updated using these values.

The reconfiguration script will then allow browser process 115 to continue processing any actions, scripts or processes that may have been defined in the original page, where this can include validations, messages, notifications and/or any other actions. The page is then submitted to the server process 120, where a response is received and presented to the user.

Figure 7:
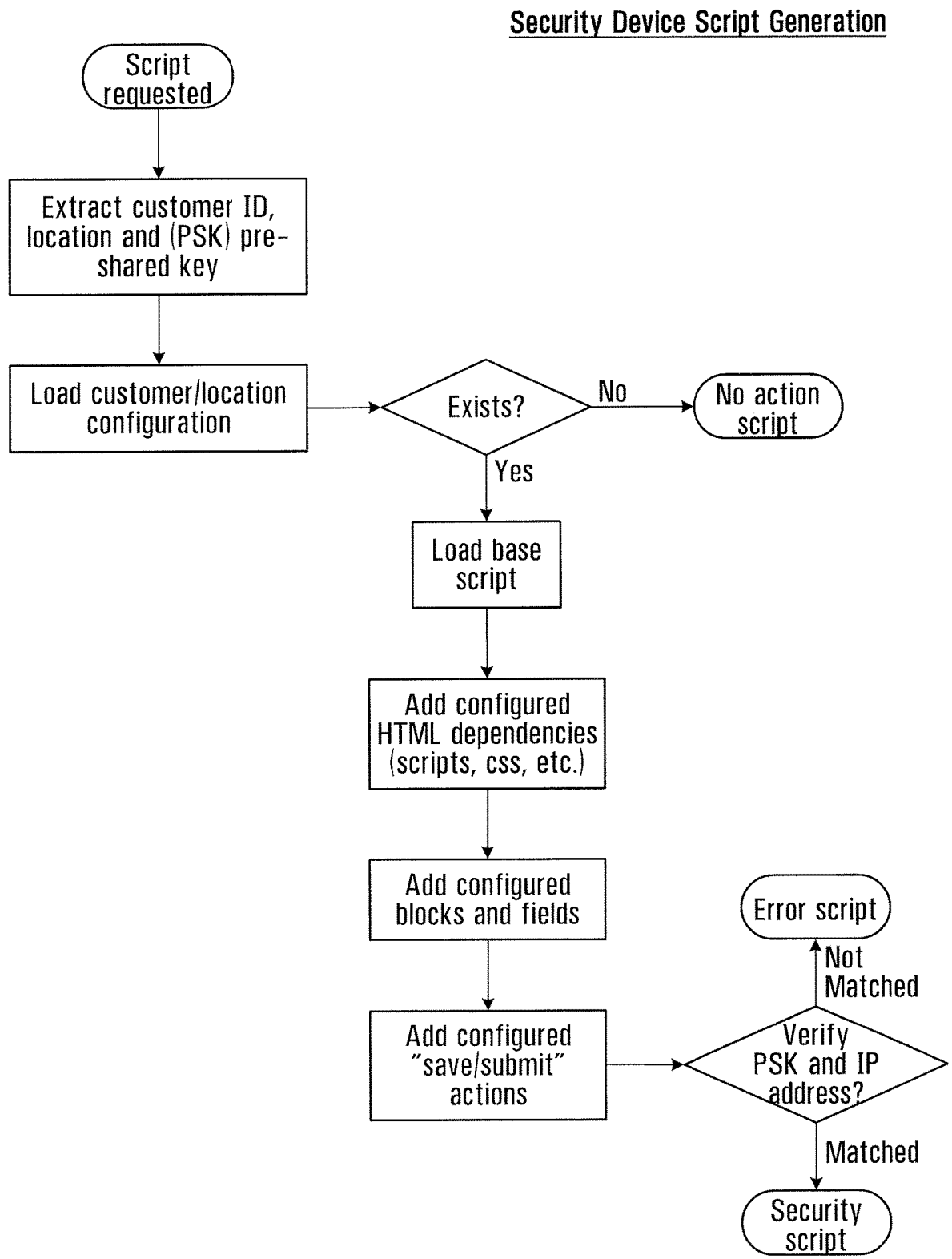
FIG. 7 is a flow chart illustrating security device reconfiguration.

FIG. 7 shows the security device reconfiguration script generation process, where the security device 24, after being requested by browser process 115, generates the script. When called, security device 24 will extract the configuration identifier 202 and pre-shared key 203 from the call. The configuration identifier 202 is used to load the configuration, where the identifier contains sufficient information to locate the configuration uniquely identifying the customer and location. If no configuration can be located the server will generate a "No Action" script, where the script will not invoke any reconfiguration. This allows for code fragment 200 to be added to a page where if not configured no actions will be taken.

Once the configuration has been loaded successfully the base script will be loaded. All configured HTML dependencies 226 are added to the script, where these dependencies are requirements for the reconfiguration script to execute. Next, the configuration details for the stored fields 223 and sensitive fields 224 are applied to the configuration such that they are included in the response in a manner that the browser process 115 is able to use then in the reconfiguration process. The last step adds the configured save actions 225 details from configuration to the script to be used by the reconfiguration script to intercept the page save actions and initiate the secure save action processing.

Upon successfully building the configuration, pre-shared key 203 will be verified against the security context 221, where the verification may involve some cryptographic functions as to make forgery of the value difficult. The calling IP address of the user device 110 is validated against the security context 221 to ensure that the user device 110 is authorized to make the request. If the pre-shared key does not match, or the IP address is not authorized then an error script response will be sent, such that the original page will be rendered unusable.

Once fully processed the reconfiguration security script is returned to the user browser process 115. For performance reasons the generated script may optionally be configured to cache the results such that subsequent calls are able to use a previously built and cached copy of the script.

Figure 8A:
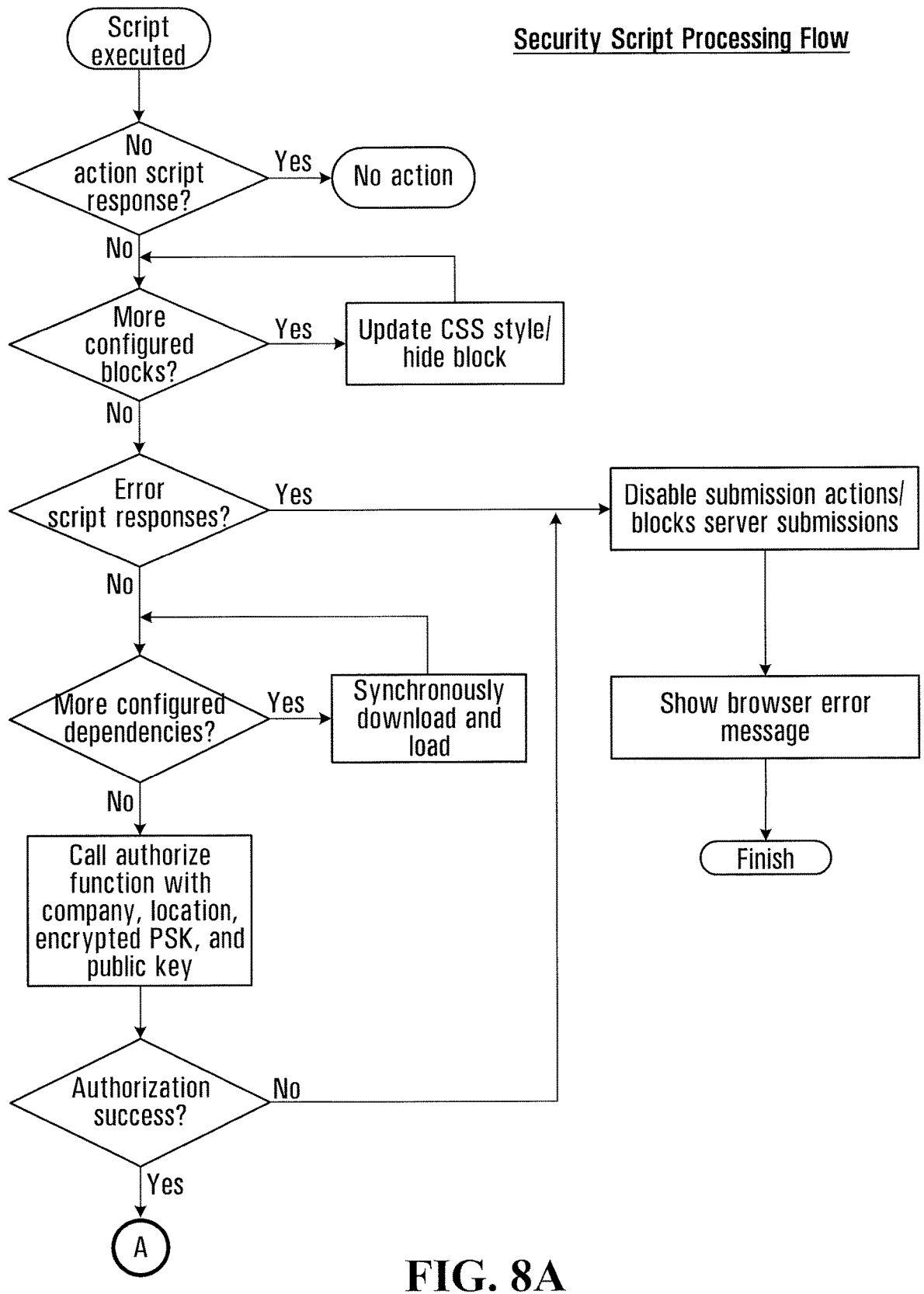
FIGS. 8A and 8B are flow charts illustrating configuration at a user browser.
Figure 8B:
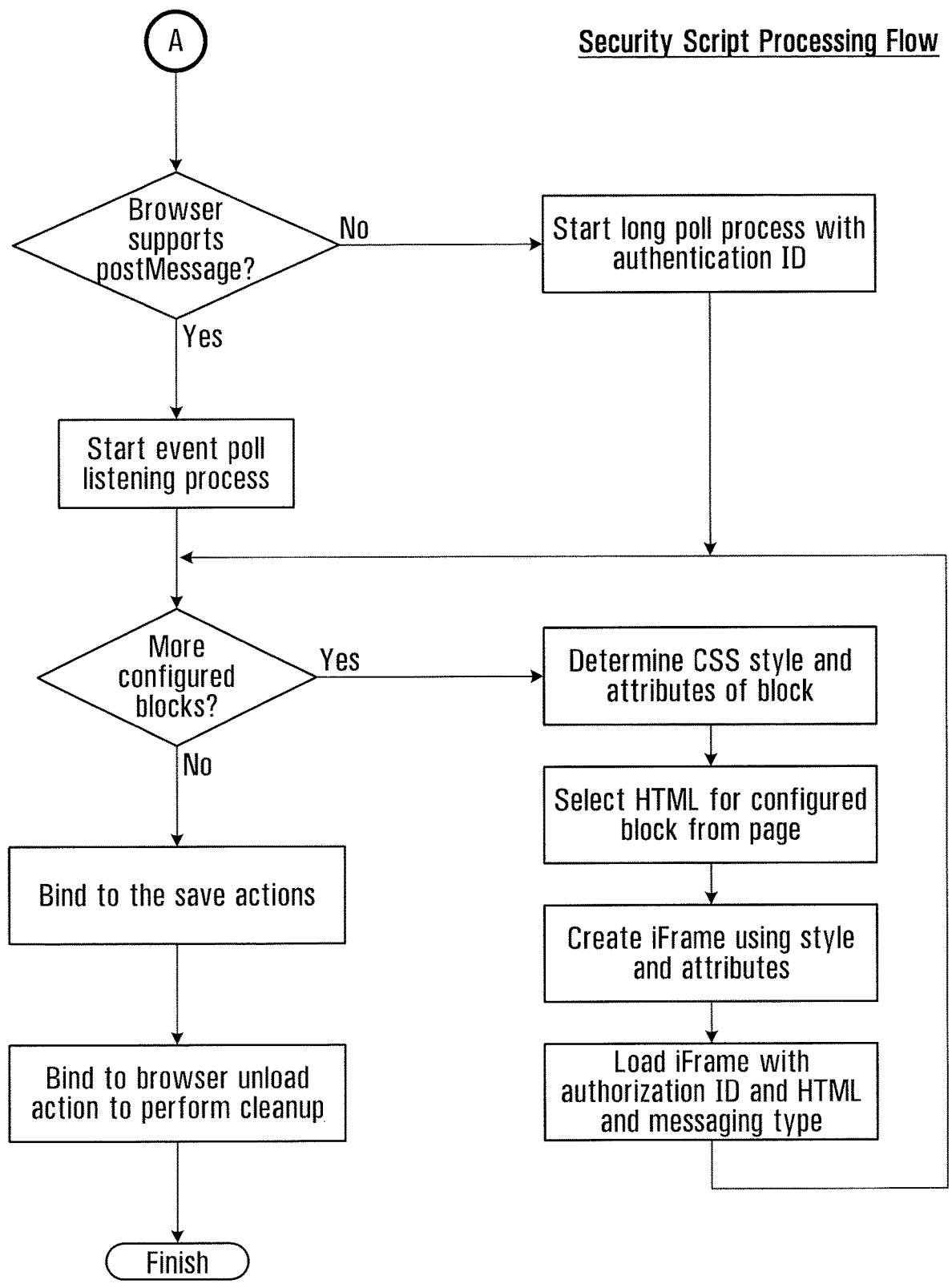

FIGS. 8A and 8B is a flow illustrating execution of a reconfiguration security script, executed by user browser 115, as a result of loading reconfiguration code 200. Upon loading, the script will first determine if this is a "No action" response, where the process ends and no action is taken.

If the script is not a "No Action" response then for each configured block in the reconfiguration script will be processed and the HTML document will be updated in such a way that the content is not visible, and where applicable the fields made read-only. This process is executed regardless of the status of the script such that if the script loading failed the secured page elements will be rendered unusable to ensure that no secure content be incorrectly transmitted.

If the reconfiguration script indicates an error response, then the page will be altered in such a way that submission actions, such as form posts, will be disabled, and the page will present the user with an error message indicating that processing could not be completed.

The reconfiguration script will synchronously download all configured dependencies as provided. Once dependencies have been loaded the script will call the authorize function on security device 24. If the authorize function fails then the same action as a script error will be executed, where the page submission will be disabled and the error message displayed. The authorized call, when successful will return an authorization id, an alpha-numeric identifier that is used to match to the server side session.

After successfully authorizing the reconfiguration script will determine if browser process 115 supports the Web Messaging functionality, which provides safe cross-origin communication. If the functionality is supported an event handler will be registered which will process Message Events. If the functionality is not supported then a timer will be started and a long poll process initiated, where the poll process is called with the authorization id.

For each configured block in the reconfiguration script the script will determine the HTML attributes and styles of the block, then it will select the text body of the HTML block. For example, an iFrame may be created at the location that the original content existed in the document, where the iFrame is assigned the same CSS attributes and styles as previously loaded from the content. The iFrame then has its location set to a URL that calls security device 24, passing the authorization id, message type (either poll or event), and the body of the HTML content. This iFrame is then added to the original document, and will initiate loading such that it contains a replica copy of the original content, and has the exact style and size attributes.

Once all configured blocks have been processed the script will bind events to the configured save actions, as well as to the browser unload event, to allow the script to cancel the timers and perform any other cleanup required. For example, if a user can specify/initiate a browser event (i.e. "Clicking Save Button"), code will attach to those events as well as to the page unload event. This allows the data to be synchronized one last time between the page and the security device, and to cleanup background processes. This relies on input from the user flowing to the security device, and being vaulted and then returning a token.

Figure 9:
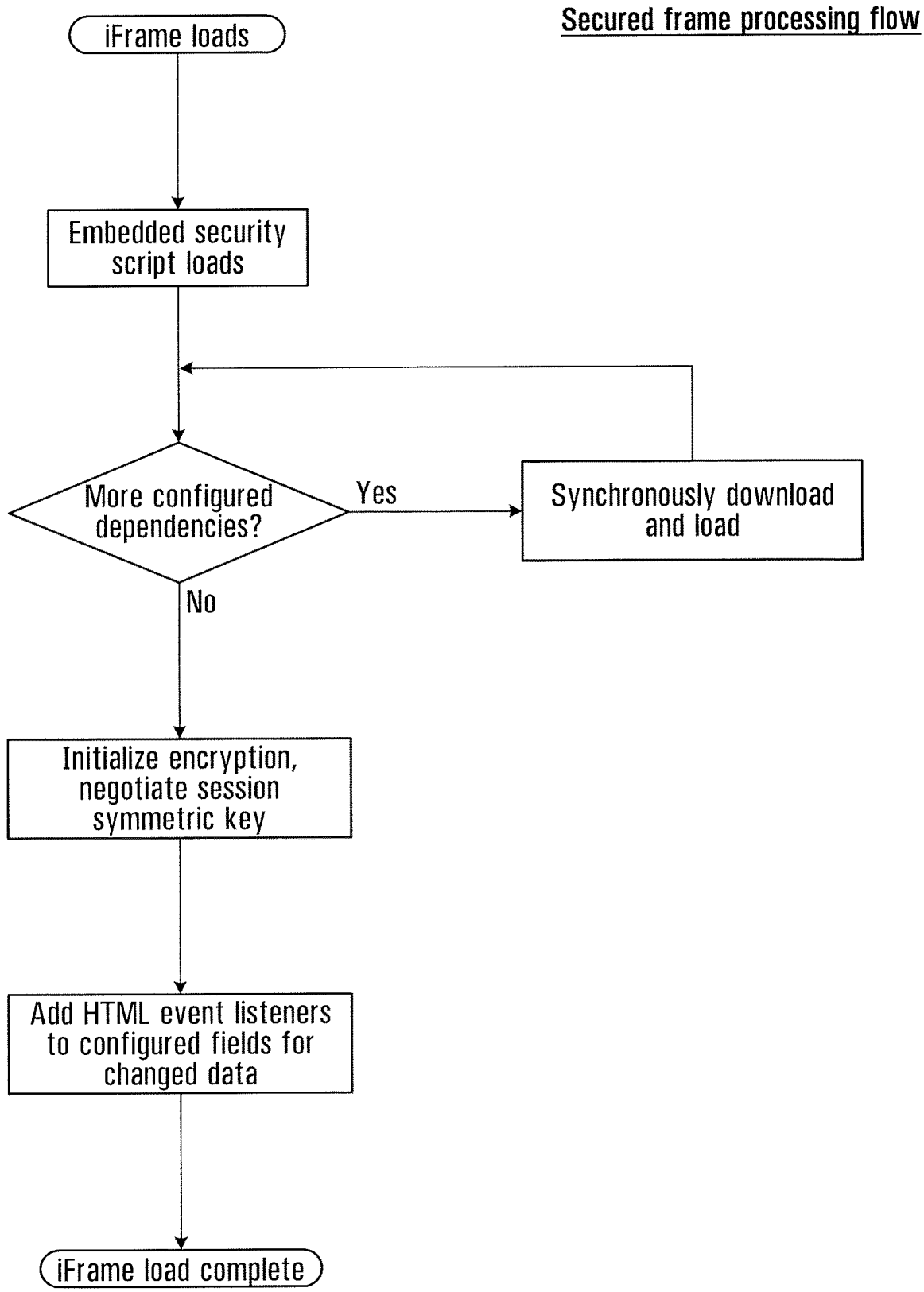
FIG. 9 is a flow chart illustrating loading of security scripts.

FIG. 9 shows the process flow for the loading of security scripts in the secured iFrame. The iFrame loads, where the initial content is a replica of the original HTML content, where the content has been wrapped in a proper document and includes any required scripts and dependencies. These scripts and dependencies may include stylesheets and/or scripts required for the secured content and/or the security process. For example, one of the dependencies may be the style sheet used by the original page, where another could be the javascript required for the AES encryption process.

Once dependencies have been loaded the security script in the secured content frame will initiate handshaking for the symmetric key using a process such as Diffie Hellman, such that the key is not passed or shared in any call.

After encryption negotiation completes the script will add event listeners for changes to each of the configured fields.

At this point the iFrame is full loaded and visible to the user.

Figure 10:
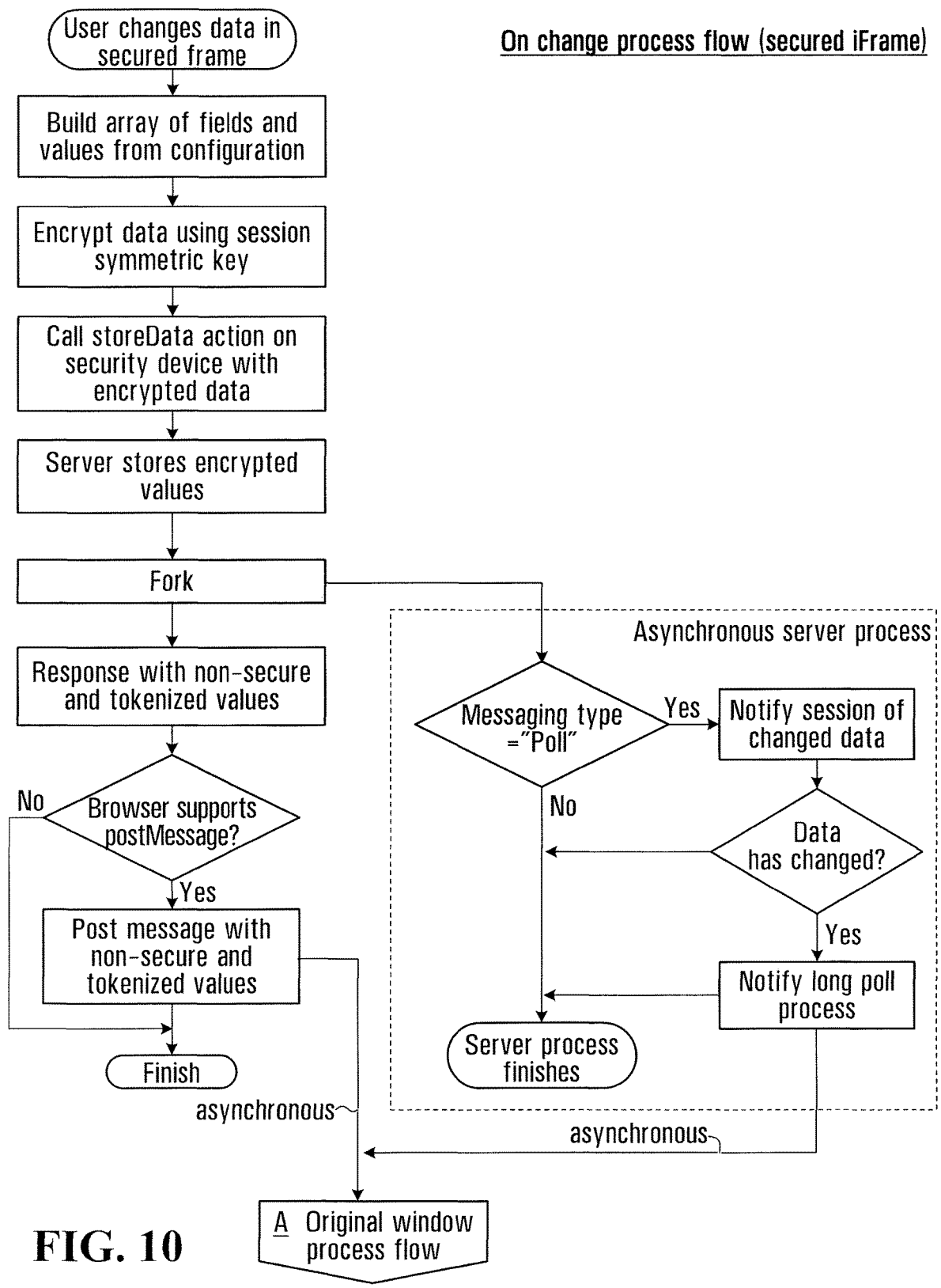
FIG. 10 is a flow chart illustrating data changes in a secured frame.

FIG. 10 shows the process flow for changes to data in the secured frame, where the event handler configured and added to the field in FIG. 9 will be executed. The process initiates when a user changes data in the secured frame for any of the configured fields and or elements.

A change in data, and therefore the execution of the event handler will cause the script to build an array of values based on the configuration, where a name/value pair array exists with the name being the identifier for the field, and the value being the current value of the element or field. This array is serialized to a transportable format (for example JSON), and then encrypted using the symmetric key previously negotiated.

The secured frame may asynchronously send the authorization id, and the encrypted data to the security device 24 using the store data function. The information is kept encrypted on the server, such that as a result of the symmetric key handshake process each session will have a different encryption key.

After the server call to save the process forks into two simultaneous paths. The server side path may determine if the method used for calling is "poll" or "event", as previously provided when the frame was loaded. If the calling method is set to "poll" then the session will be notified of the change. The session will determine, using an efficient means such as a hash or other comparison function if the data has changed. If the data has changed then the long poll process will be notified so that it releases and returns as described in FIG. 12, the long poll process in the original window.

If the messaging type is not "poll", or if the data has not changed then the server process path finishes with no actions.

The browser process path will receive the response from the storeData call which will include the substitute tokens as well as the non-secured values. If the browser supports the postMessage processing, and the messaging type is set to "event" then the script will raise an event with the data returned from the storeData call, targeted at the original window. The script then completes with no further actions.

Figure 11:
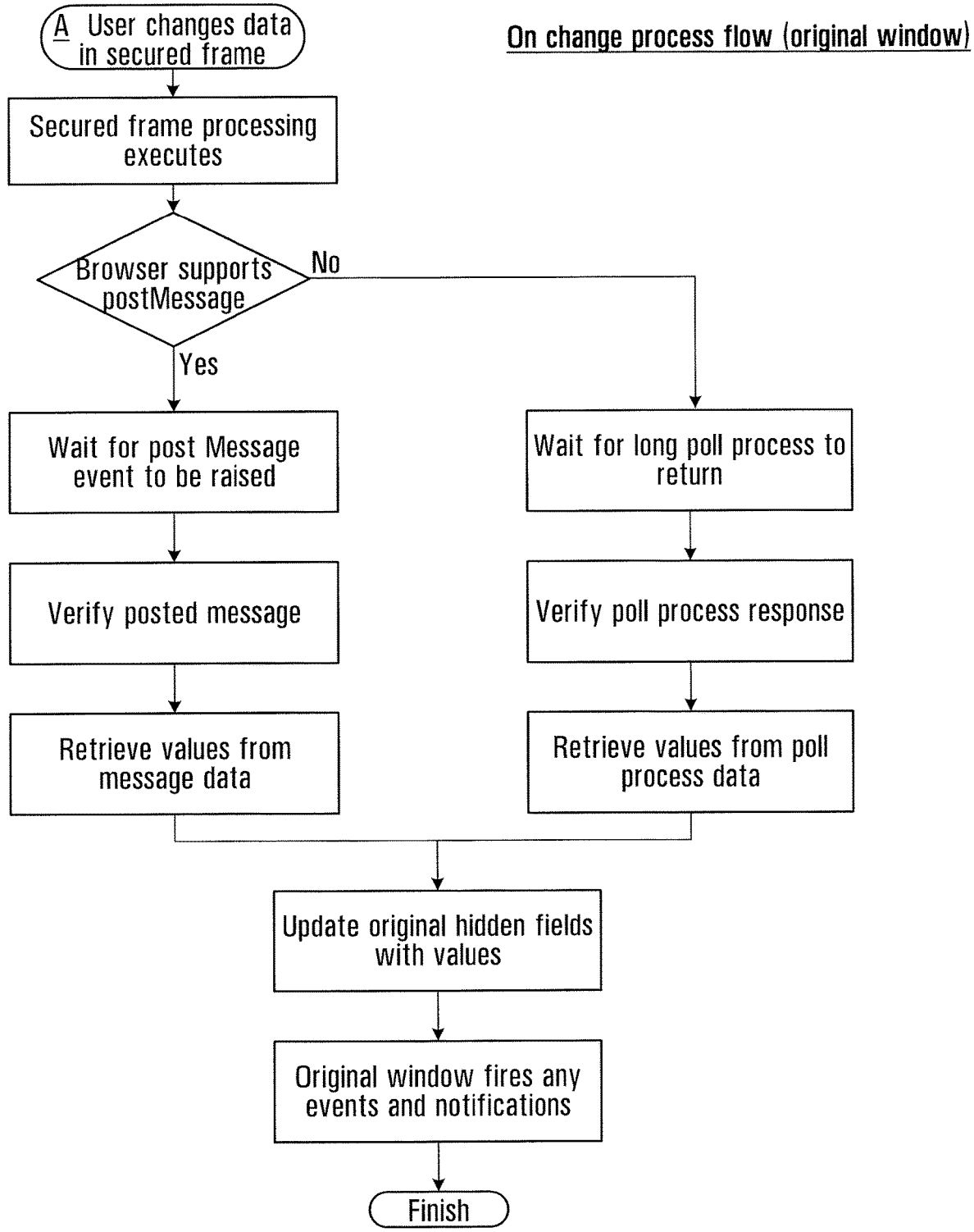
FIG. 11 is a flow chart illustrating changes in the original window.

FIG. 11 shows the process flow for changes in the original window, where the change was initiated in the secured frame. When the secured frame change process initiates the original window will receive the event either from the poll process or the Web messaging process.

If the browser supports the web messaging function then the timer will run in a loop waiting for events to be raised. If an event is raised as a result of a change in the process in FIG. 10, then the message will be received, and verified to ensure it is intended for this window, where the authorization id is used in the message data to ensure that the correct window processes the message.

The data will be loaded from the event and the original fields, which are now hidden will be updated with the supplied values. If the original window had any event handlers registered against the original fields they will be fired as part of the updating process, such that any original actions will continue to function.

If the browser does not support the web messaging function, then the timer will be executing the long poll process. The long poll process blocks until it receives a response or times out. If the poll process exists with data then the values are verified, where the authorization id is included in the data to ensure that the data is correctly received.

Data will be loaded from the poll response and original fields, which are now hidden will be updated with the supplied values. If the original window had any event handlers registered against the original fields they will be fired as part of the updating process, such that any original actions will continue to function.

Figure 12:
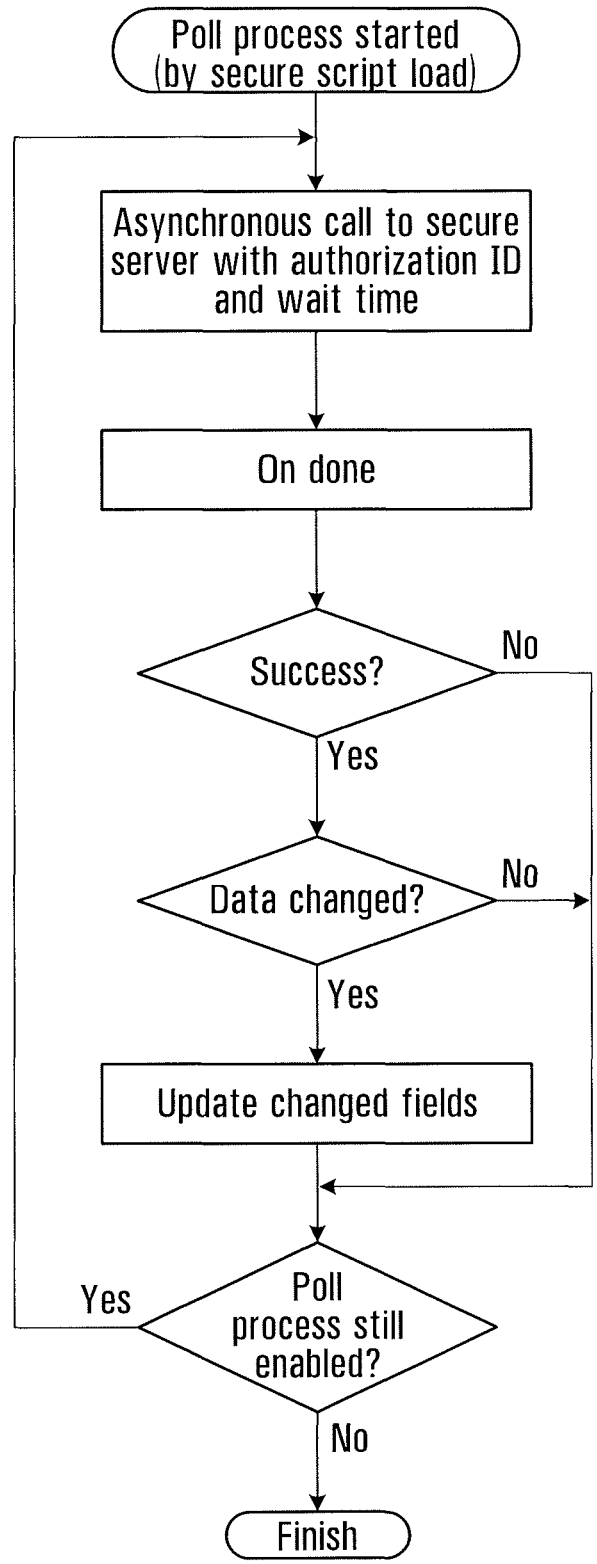
FIG. 12 is a flow chart illustrating poll process running.

FIG. 12 shows the process flow of the poll process running in the original window, which handles responses for changes in the secured frame when the browser does not support the web messaging functionality, or the messaging type is set to "poll". When the reconfiguration script executes in the original window, the poll process and time will have been initiated. The poll process makes an asynchronous call to secure device 24 passing the authorization id and the wait time. The secure device 24 will block the process until either the timeout is reached or it is notified of a change in data as exemplified in FIG. 10.

When the poll process on the security device 24 releases the status of the response is verified to ensure it is successful. If the process was not successful the process continues to the end block to determine if it should continue running, and if required will restarted the process.

If the response is a success, and data has changed then the data will be loaded from the poll response and the original fields, which are now hidden will be updated with the supplied values. If the original window had any event handlers registered against the original fields they will be fired as part of the updating process, such that any original actions will continue to function.

The process will check if the poll process is still executing, and if so will restart the timer and poll process. If the poll time has finished, as a result of the on save action calling, then the timer will not be restarted and the process will end.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of securing user data provided through a webpage, said method comprising:
receiving an electronic file comprising webpage code that defines a webpage displayable by a computer, said webpage configured to, when displayed:
present an input field for receiving said user data from a user of said computer, and instruct said computer to transmit said user data to a defined server; and
executing code that causes said computer to:
reconfigure said webpage code to form replacement webpage code that defines a replacement field for receiving said user data from said user instead of said input field;
configure said replacement webpage code to transmit said user data to a secured server instead of said defined server, upon receiving said user data in said replacement field;
configure said replacement webpage code to receive token data from said secured server; and
configure said webpage code to transmit said token data instead of said user data to said defined server.

2. The method of claim 1, wherein said code further causes said computer to reconfigure said replacement webpage code to hide said input field.

3. The method of claim 1, wherein said code further causes said computer to populate said input field with said token data.

4. The method of claim 1, wherein said user data comprises a payment card number.

5. The method of claim 1, wherein said webpage is further configured to, when displayed, present an output field for displaying data received from said defined server, and said code further causes said computer to display data received from said secured server instead of said defined server.

6. The method of claim 1, wherein said code further causes said computer to encrypt said user data prior to said transmitting said user data.

7. The method of claim 6, wherein said code further causes said computer to obtain an encryption key from said secured server, and said encrypting comprises encrypting said user data with said encryption key.

8. The method of claim 1, wherein said code further causes said computer to identify said input field from amongst a plurality of input fields.

9. The method of claim 1, wherein said reconfiguring said webpage comprises presenting said replacement field to appear substantially similar to said input field.

10. The method of claim 1, wherein said electronic file is a HyperText Markup Language file.

11. The method of claim 1, further comprising downloading modifying code at said computer to cause said computer to reconfigure, transmit said user data, receive token data, and transmit token data.

12. A computing device comprising a processor and memory, said processor executing a browser displaying a webpage, said browser causing said computing device to:
   receive an electronic file comprising webpage code defining said webpage to present an input field for receiving user data from a user of said computing device, and instruct said computing device to transmit said user data to a defined server; and
   receive, in response to executing said electronic file, modifying code that causes said computing device to:
     reconfigure said webpage code to produce replacement webpage code that presents a replacement field for receiving said user data from said user instead of said input field;
     wherein said replacement webpage code is configured to, upon receiving said user data in said replacement field, transmit said user data to a secured server instead of said defined server;
     wherein said replacement webpage code is configured to receive token data from said secured server; and
     transmit said token data instead of said user data to said defined server.

13. Non-transient computer readable medium, storing computer executable instructions for execution by a computing device executing a browser to display a webpage provided by way of webpage code, that solicits selected user data, said computer executable instructions causing said computing device to:
   reconfigure said webpage code to produce replacement webpage code to present a replacement field for receiving said selected said user data from a user of said computing device instead of an input field;
   reconfigure said webpage code to produce replacement webpage code to transmit said user data to a secured server instead of a previously defined server, upon receiving said user data in said replacement field;
   receive token data from said secured server; and
   configure said webpage code to transmit said token data instead of said user data to said previously defined server.

14. Non-transient computer readable medium of claim 13, further storing computer executable instructions that when executed by the computing device cause the computing device to:
   receive an electronic file comprising webpage code that define said webpage displayable by the computing device, wherein said webpage code configures said webpage to:
     present an input field for receiving said selected user data from a user of said computer, and
     instruct said computer to transmit said selected user data to said previously defined server.

\* \* \* \* \*